(12) United States Patent
Bachurinskiy

(10) Patent No.: US 9,996,727 B2
(45) Date of Patent: Jun. 12, 2018

(54) METHOD AND DEVICE FOR DETECTING MOVING OBJECTS SUCH AS FINGERPRINTS AND CORRESPONDING COMPUTER PROGRAM PRODUCT

(71) Applicant: Green Bit S.p.A., Grugliasco (Turin) (IT)

(72) Inventor: Andrey Bachurinskiy, Grugliasco (IT)

(73) Assignee: Green Bit S.p.A., Grugliasco (Turin) (IT)

( * ) Notice: Subject to any disclaimer, the term of this patent is extended or adjusted under 35 U.S.C. 154(b) by 0 days. days.

(21) Appl. No.: 15/306,845

(22) PCT Filed: Apr. 27, 2015

(86) PCT No.: PCT/IB2015/053045
§ 371 (c)(1),
(2) Date: Oct. 26, 2016

(87) PCT Pub. No.: WO2015/166393
PCT Pub. Date: Nov. 5, 2015

(65) Prior Publication Data
US 2017/0046559 A1 Feb. 16, 2017

(30) Foreign Application Priority Data
Apr. 28, 2014 (IT) .............................. TO2014A0346

(51) Int. Cl.
*G06K 9/00* (2006.01)
*G06T 7/00* (2017.01)
(52) U.S. Cl.
CPC ..... *G06K 9/00087* (2013.01); *G06K 9/00026* (2013.01); *G06K 9/00335* (2013.01); *G06T 7/004* (2013.01); *G06T 7/0038* (2013.01)

(58) Field of Classification Search
CPC .......... G06K 9/00087; G06K 9/00026; G06K 9/00335; G06K 9/00019; G06K 9/00084;
(Continued)

(56) References Cited

U.S. PATENT DOCUMENTS 6,151,791 A * 11/2000 Shimazutsu ............ B21B 38/12
33/533
2003/0006959 A1* 1/2003 Varanda ................ G06F 1/1613
345/156
(Continued)

FOREIGN PATENT DOCUMENTS

EP 2 400 432 12/2011
EP 2 624 200 8/2013

OTHER PUBLICATIONS

International Search Report and Written Opinion of the ISA for PCT/IB2015/053045, dated Aug. 26, 2015, 9 pages.

*Primary Examiner* — Amir Alavi
(74) *Attorney, Agent, or Firm* — Nixon & Vanderhye P.C.

(57) ABSTRACT

A method for acquiring the image of an object, such as a part of a hand, that is rolled on a detection surface. The method comprises acquiring the image on an area on which the object is rolled that is located within the detection surface. The method comprises:
  detecting an initial position of the object positioned on the detection surface; and
  locating the rolling area within the detection surface as a function of the initial position in which the object has been positioned on the detection surface.

6 Claims, 5 Drawing Sheets

(58) Field of Classification Search
CPC .......... G06K 9/00065; G06K 9/00013; G06T 7/004; G06T 7/0038
See application file for complete search history.

(56) References Cited

U.S. PATENT DOCUMENTS

| | | | |
|---|---|---|---|
| 2005/0083174 A1* | 4/2005 | Nakamura | B60R 25/246 340/5.72 |
| 2009/0326857 A1* | 12/2009 | Mathews | G06F 3/0346 702/141 |
| 2013/0158946 A1* | 6/2013 | Scherberger | G06F 3/014 702/151 |
| 2017/0046559 A1* | 2/2017 | Bachurinskiy | G06K 9/00026 |
| 2017/0199577 A1* | 7/2017 | Koomen | G01C 19/5776 |

* cited by examiner

METHOD AND DEVICE FOR DETECTING MOVING OBJECTS SUCH AS FINGERPRINTS AND CORRESPONDING COMPUTER PROGRAM PRODUCT

This application is the U.S. national phase of International Application No. PCT/IB2015/053045 filed 27 Apr. 2015, which designated the U.S. and claims priority to IT Application No. TO2014A000346 filed 28 Apr. 2014, the entire contents of each of which are hereby incorporated by reference.

TECHNICAL FIELD

The present disclosure relates to techniques for detecting images of moving objects.

One or more embodiments may refer to acquisition of images of a part of a hand (e.g., a finger, the outer edge of the palm, the so-called "thenar") in order to detect a skin-print.

TECHNOLOGICAL BACKGROUND

In the sector of skin-prints detection, devices have been developed comprising a single detection surface (or "platen") associated to which is a single sensor capable of operating both over a "large" area, for detecting, for example, the palmprint of a hand, and over a "medium" or "small" area, for detecting, for example, the fingerprint of a finger that is rotated or rolled on the detection surface or else the fingerprint of just the tip of a finger.

For instance, known from the document No. EP 2 400 432 A1 is a detection device comprising a detection surface, a sensor for generating a sequence of images of a moving object, such as a finger that is rolled on the detection surface, and processing means for processing the sequence of images generated by the sensor which are configured for identifying, in the object that is rolled, a front edge in the rolling movement, with the sensor configured for generating the sequence of images with a detection window that follows the aforesaid front edge in the rolling movement.

To carry out detection properly, the finger may need to be positioned initially with a certain degree surface, for example, on one side (on the left or on the right) of the detection surface.

This may be required, for example, in order to leave space free for the rolling movement in a direction opposite to the starting one, preventing the skin print from being "clipped" on the opposite edge of the fixed area thus limiting the rolling movement of the object in this direction.

The boundaries of these fixed areas of positioning, that form part of the entire detection surface, may be difficult to distinguish in a visible way directly on the detection surface, which is constituted, for example, by a (semi)transparent glass screen.

A practical way of delimiting these fixed areas may be that of using markers. However, this solution can create some drawbacks in execution of a precise initial positioning, for example, of a finger along the perimeter of a predefined rolling area (above all for objects with a long rolling path such as an entire finger that is being rolled). This may lead to having to make various attempts of initial positioning of the finger (or, in general, of the part of hand concerned); i.e., it may lead to a number of "positioning and checking" operations, before actual start of the rolling step.

Furthermore, since fingerprint scanning may be used in applications of law enforcement (for example, in police stations), where the subjects may not be particularly co-operative or may even put up resistance in regard to the taking of fingerprints, the need to achieve a precise initial positioning of the finger may constitute a non-negligible problem.

OBJECT AND SUMMARY

In the context of application outlined above, there emerges the need to ensure that the operation of detection, for example, of a skin-print, does not require initial precise positioning of the object to be scanned.

The object of one or more embodiments is to meet the need outlined above.

In one or more embodiments, the above object is achieved thanks to a method having the characteristics recalled specifically in the ensuing claims.

Various embodiments may also regard a corresponding device, as well as a corresponding computer program product, which can be loaded into the memory of a computer and comprises portions of software code that are designed for implementing the steps of the method when the product is run on at least one computer. As used herein, such a computer program product is understood as being equivalent to a computer-readable means containing instructions for control of the processing system so as to co-ordinate execution of the method according to one or more embodiments.

The claims form an integral part of the technical teaching provided herein in relation to the embodiments.

BRIEF DESCRIPTION OF THE DRAWINGS

One or more embodiments will be described, purely by way of non-limiting example, with reference to the annexed figures, wherein.

It will be appreciated that, for greater clarity of illustration, the details visible in the figures are not to be considered as necessarily being represented in scale.

DETAILED DESCRIPTION

In the ensuing description, various specific details are illustrated aimed at providing an in-depth understanding of examples of embodiments. The embodiments may be provided without one or more of the specific details, or with other methods, components, materials, etc. In other cases, known structures, materials, or operations are not illustrated or described in detail so that the various aspects of the embodiments will not be obscured. Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. In addition, particular conformations, structures, or characteristics may be combined in any adequate way in one or more embodiments.

The references used herein are provided only for convenience and hence do not define the sphere of protection or the scope of the embodiments.

Figure 1:
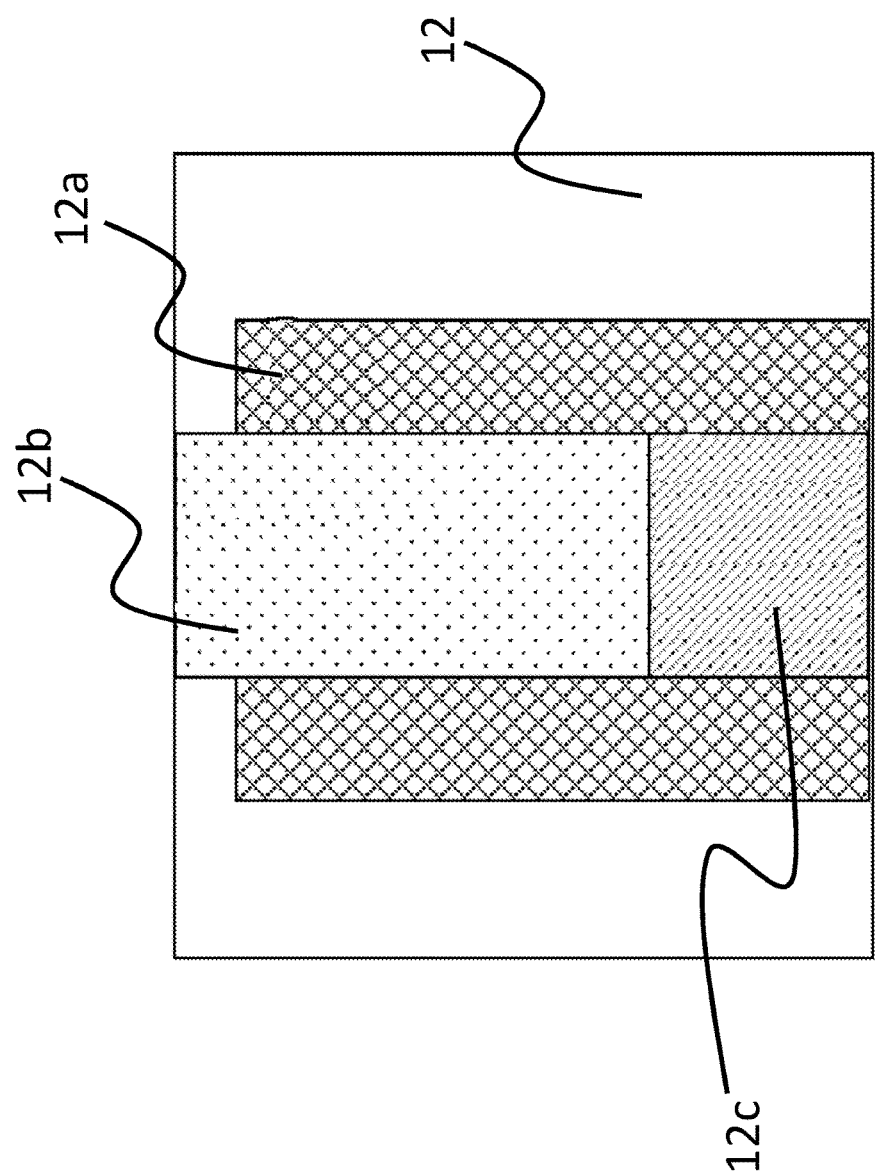
FIG. 1 and FIG. 2 exemplify detection of images of objects such as a part of a hand.

FIG. 1 presents in general terms an example in which, defined within a detection surface (platen) 12 are multiple fixed rolling areas 12a, 12b, 12c. For instance, the wider area, designated by 12a, may be which is smaller, may be used for detecting a finger that is being rolled, and the area 12c, which is even smaller, may be used for detecting the tip of a finger that is being rolled. Consequently, the dimensions, both the horizontal ones and the vertical ones, of these fixed rolling areas may be chosen so as to contain completely the objects for which they are designed.

Figure 2:
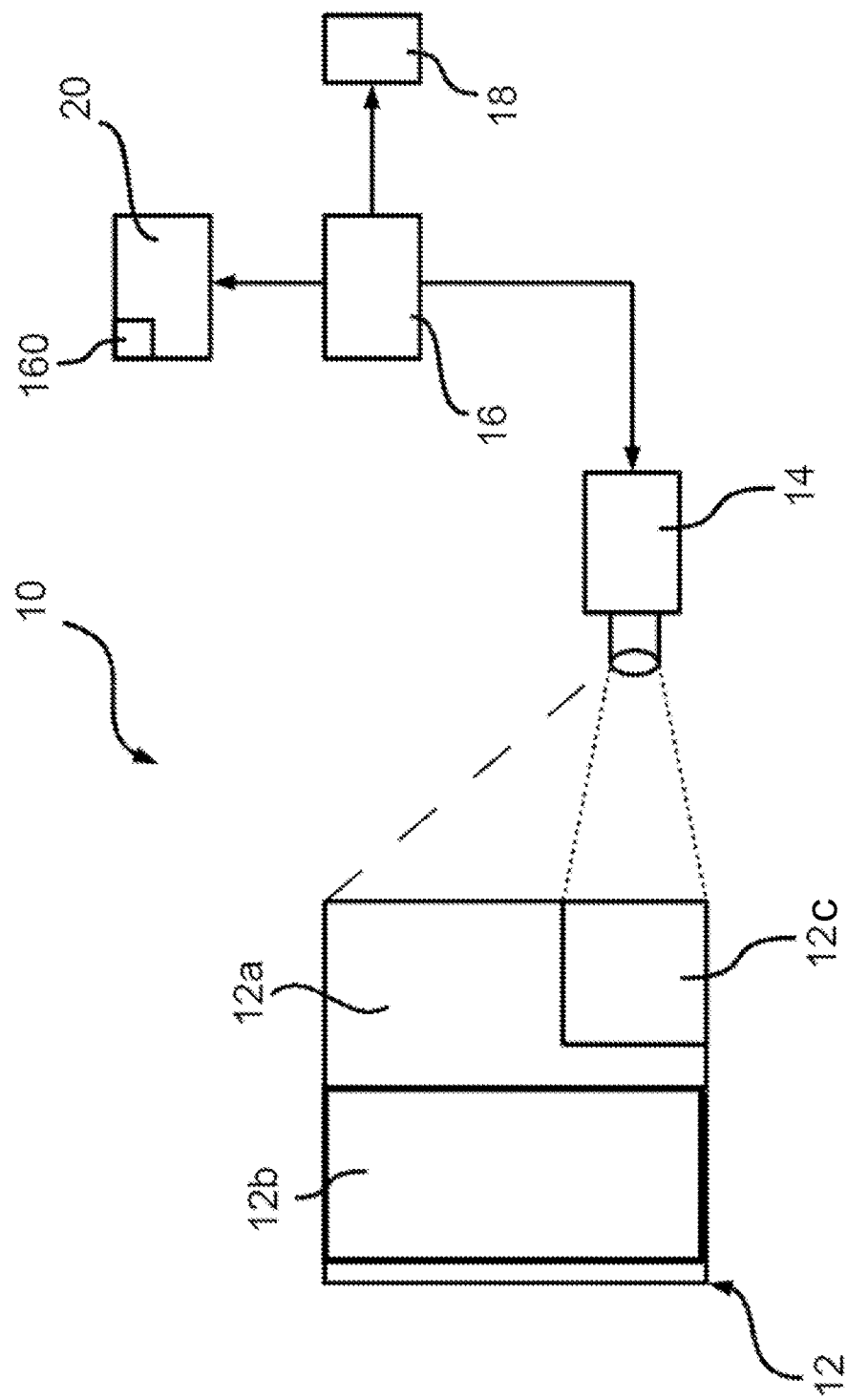

The overall architecture of a corresponding device 10 that can be used for detection of skin-prints is represented in FIG. 2.

In this figure, the reference number 12 designates as a whole the detection surface comprising, for example, a plane or curved (semi)transparent screen.

Illustrated in FIGS. 1 and 2 are two different examples of positioning of the large area 12a, the medium area 12b, and the small area 12c, but the arrangement of these areas in the detection surface 12 may be any whatsoever.

The reference number 14 designates an optical sensor (in practice, a photographic/video camera, for example of a high-definition type) that is able to perform its detection function on the three areas defined on the detection surface 12.

The output signal of the sensor 14 may be sent to a processing unit 16 (such as, for example, a microprocessor), which receives this signal, possibly already pre-processed in the sensor 14 itself, and is able to process the images of the skin-prints, in view, for example, of storage thereof in a database 18, and/or possible presentation thereof on a display unit 20, and/or possible comparison thereof with images stored in a database for the purposes of identification of a subject.

In various embodiments, the operations of processing of the signal coming from the sensor 14 may be either concentrated in the processing unit 16 or shared in part between the sensor 14 (at the pre-processing level) and the processing unit 16.

For instance, the operation of detection of the fingerprint may lead to generation, starting from the individual images collected during the rolling movement of the object, of an overall image of the finger referred to as "composite roll image".

In basic terms, and with the exception of what is described more fully in what follows, the general structure and general criteria of operation of the apparatus 10 correspond to known structures and criteria, which renders a more detailed description herein superfluous.

In the sequel of the description, one or more embodiments will refer to an overall architecture of a device for detecting skin-prints of the type represented in FIG. 2.

It will be appreciated that one or more embodiments may, however, be irrespective of the division of the detection surface 12 into the fixed areas 12a, 12b, and 12c.

One or more embodiments may envisage use, for detecting the image of an object, for example the fingerprint of a finger F, of an adaptive (and hence not fixed and pre-set) positioning of a rolling area 140, as a function of the effective initial positioning of the object to be scanned within the entire detection surface 12.

One or more embodiments may regard a method for detecting the image of an object, such as a part of a hand F, that is rolled on a detection surface 12, the method comprising detecting the aforesaid image on an within the detection surface.

In one or more embodiments the method may include:
  detecting an initial position of the object positioned on the detection surface 12; and
  locating the aforesaid rolling area 140 within the detection surface 12 as a function of the initial position in which the object F has been positioned on the detection surface 12.

In one or more embodiments, the rolling area 140 can be kept in a fixed position with respect to the detection surface 12 during the rolling movement of the object F on the detection surface 12.

For instance, in one or more embodiments, the rolling area is such as to enclose the object F within it. Optionally, this may occur throughout the rolling movement of the object F, which may enable the rolling area to be kept in a fixed position.

In one or more embodiments, the rolling area may be moved with respect to the detection surface 12 so as to follow the rolling movement of the object F on the detection surface 12.

For instance, in one or more embodiments, the rolling area may enclose within it a part of the object, for example, a part adjacent to the edge of the object F that is at the front during the rolling movement, as exemplified in EP 2 400 432 A1.

Figure 3:
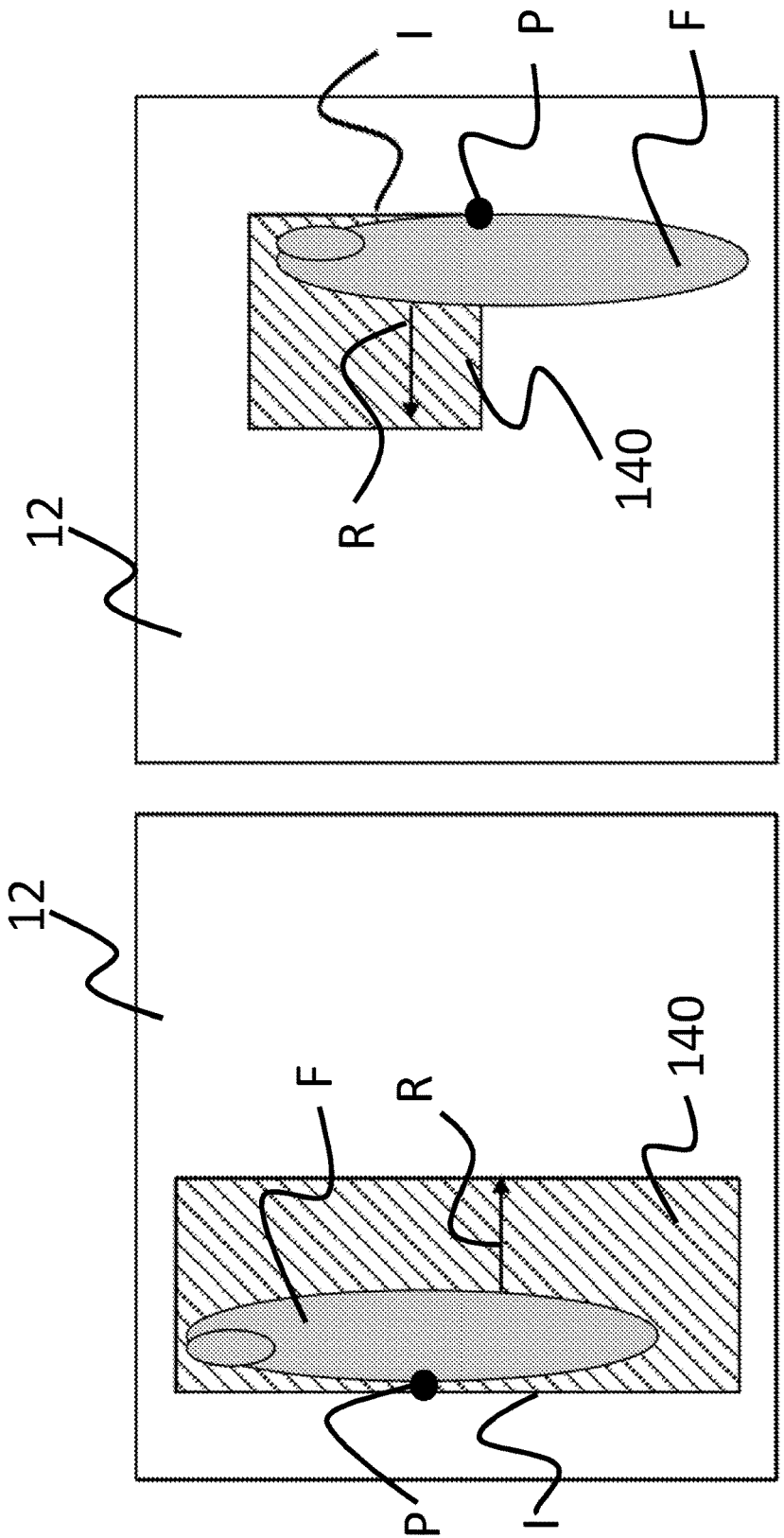
FIGS. 3A and 3B exemplify an operation of detection according to embodiments.
Figure 4:
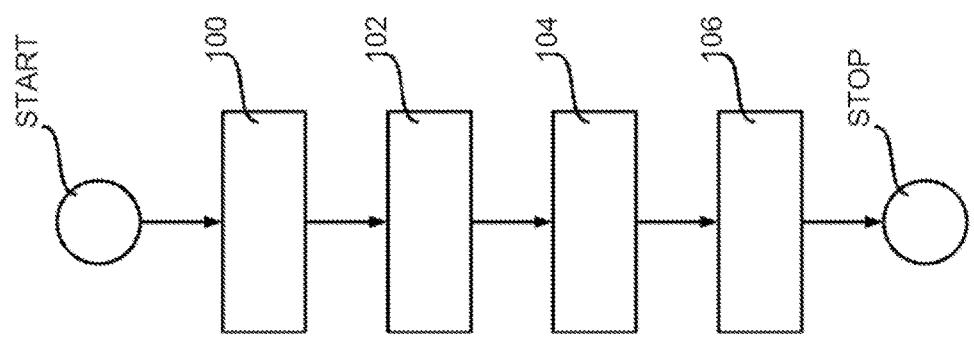
FIG. 4 is a flowchart representing operation of embodiments; and that show an operation of detection according to embodiments.

In one or more embodiments, the sensor 14 and the processing unit 16 may operate according to the criteria schematically represented in FIG. 3 and recalled in the flowchart of FIG. 4.

In this regard, it will be appreciated that, in the framework of the present description of examples of embodiment, the object that is being scanned is referred to for brevity as "part of a hand" (e.g., a "thenar"), even though, to be more precise, it is the impression of the part of hand on the detection surface, on the rolling area, on the preview area, etc.

After a starting step (START) for initialization of the device, in one or more embodiments the system described herein can set itself initially in a preview step 100 (with high or low resolution), where the detection surface 12 is initially inspected, i.e., scanned, by the sensor 14 over its entire surface, so as to identify the effective position P of a finger F (see FIGS. 3A and 3B).

In particular, the position P may correspond to the outermost end of the print of the finger F set in contact with the detection surface 12, where by "outermost end" may be understood the peripheral portion of the image more distant from the centre of the detection surface 12.

In one or more embodiments, in the preview step 100 the preview area may be selected so as to correspond to the entire extension (at least in width) of the detection surface 12.

In this way, it is possible to provide the maximum freedom in the initial positioning of the finger on the detection surface 12.

In one or more embodiments, it is, however, possible to detect the aforesaid initial position of the object F positioned on the detection surface 12 within a preview area (more restricted than the entire detection surface) within which the rolling area is then located.

For instance, in one or more embodiments, the preview area may be selected with a height such as to contain completely the object being rolled (thenar, finger, fingertip).

Figure 5:
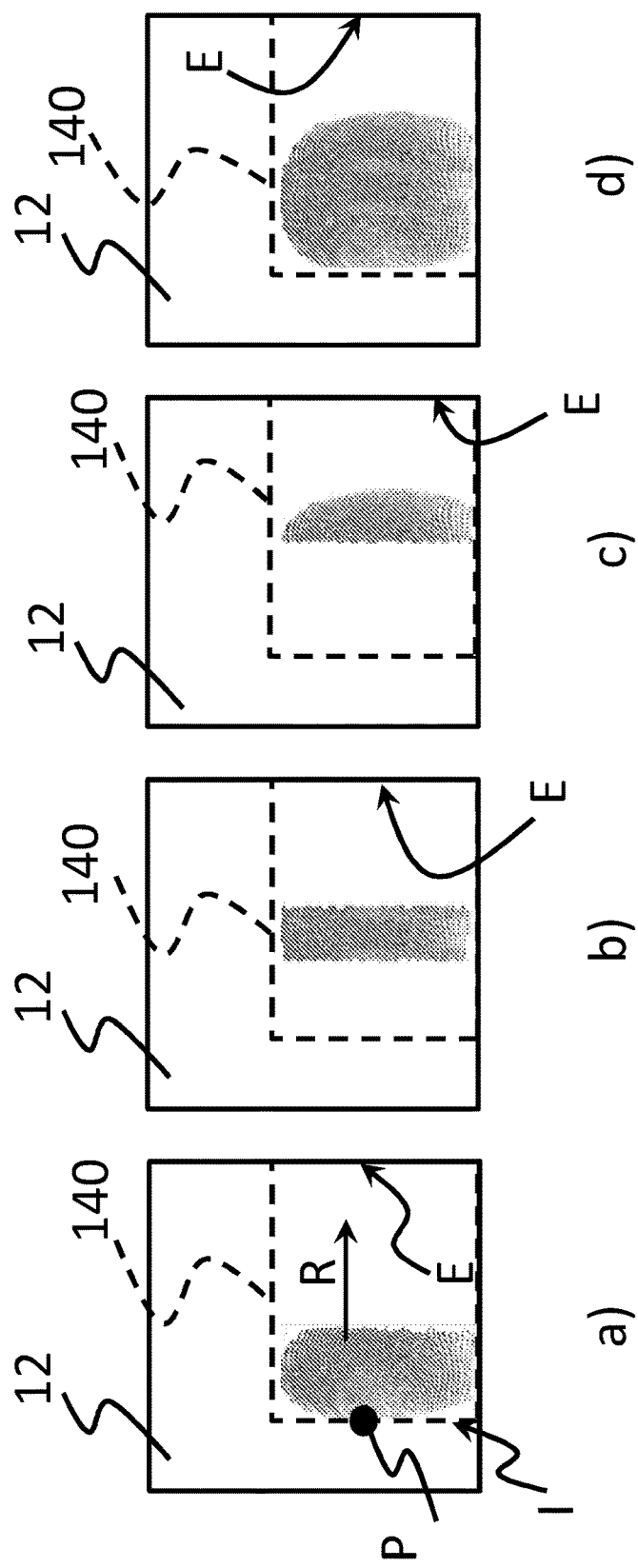

In one or more embodiments (as illustrated in FIG. 5), the bottom edge of the rolling area 140 may be aligned with the bottom edge of the detection surface 12 for example, for ergonomic considerations and/or to render the subsequent rolling operation simpler.

One or more embodiments, which can be used, for example, for rolling areas of small dimensions, may envisage defining the height of the preview area equal to the total height of the entire detection surface 12, rendering positioning of the finger within the detection surface 12 free also in the vertical direction.

Whatever the specific details of implementation of the above preview step 100, following upon this step, the system (basically the unit 16) is able to acquire basic information on the initial position P of the finger F, kept stationary in this preview step.

In one or more embodiments, the system is able to acquire information also on the "expected" direction of the rolling movement.

This information may be useful both when it is envisaged to move the rolling area with respect to the detection surface 12 following the rolling movement of the object F on said surface, and when it is envisaged to keep the rolling area in a fixed position with respect to the detection surface 12 during the aforesaid rolling movement.

In addition to being useful for possibly following the rolling movement, this information may in fact also be useful for co-ordinating the behaviour of the system and the operator (e.g., to enable the finger to be rested on the correct side before being rolled: left side for rolling to the right, and vice versa).

For instance, in one or more embodiments, the expected direction may be to the right or to the left, according to whether, for example, the finger F has been initially identified on the left side (FIG. 3A), or on the right side (FIG. 3B), of the detection surface 12.

In one or more embodiments, at the end of the preview step 100 it is possible to identify the initial position P of the finger F, and from the preview step it is possible to pass to an acquisition step (for example, with high resolution and high framerate) in a rolling modality of the object to be scanned, i.e., the finger F.

In one or more embodiments, on the basis of this information, the system may evolve towards a step 102 of rolling detection.

In one or more embodiments, during this step, for example following upon a visual warning (possibly accompanied by an acoustic warning) on a region 160 of the display unit 20, the person whose fingerprint is to be taken, can begin, for example, starting from a situation such as the one illustrated in FIG. 3A, to roll his finger F on the detection surface 12 from left to right, as viewed in the example illustrated in FIG. 5.

In one or more embodiments, the first operation of the acquisition step may comprise, for example, a positioning of the initial edge I of the rolling area 140 in the initial position P where the finger F has been detected.

In one or more embodiments, the initial edge I of the rolling area 140 may be aligned with the front (or rear) edge of the image of the finger F on the detection surface 12.

In one or more embodiments, the above adaptive approach may enable positioning of a finger F anywhere (horizontally and, if applicable, also vertically) within the detection surface 12.

In one or more embodiments, the system may adapt automatically the position of the rolling area 140 as a function of the initial position P of the finger F detected in the previous preview step 100 (see FIGS. 3A and 3B).

In one or more embodiments, for vertical positioning (if this is required by the application and allowed by the embodiment), according to the specific object to be scanned, it is possible to adopt one of the following strategies of alignment:

alignment with the top edge of the finger F (Finger—top): according to this strategy, the top edge of the rolling area may be aligned with the top edge of the fingerprint acquired, preferably also leaving some space available;

alignment with the bottom edge of the finger F (Finger—bottom): according to this strategy, the bottom edge of the rolling area may be aligned with the bottom edge of the fingerprint acquired, preferably also leaving some space available; and centred alignment (centring): according to this strategy, the central part of the rolling area may be aligned with the central portion of the fingerprint acquired.

In one or more embodiments, for horizontal positioning, the procedure of adaptive positioning of the rolling area 140 may be synchronised with the behaviour "predicted" in the preview step 100.

In one or more embodiments, the rolling direction may not be known, not even "implicitly", in the preview step.

In this case, in one or more embodiments, the system may apply a criterion of "rolling towards the centre".

In one or more embodiments, if in the preview step the initial position P of the finger F to be rolled is detected in the left half of the detection surface 12, this can mean that the finger F will with every likelihood be rolled to the right (i.e., towards the centre of the detection surface). In FIG. 3A, for example, the finger F is identified in the left-hand part of the detection surface 12, and the arrow R indicates the rolling direction predicted and expected towards the centre of the detection surface.

FIG. 5 exemplifies a case (for instance, with the finger F initially positioned on the left side of the detection surface 12, as illustrated also in FIG. 3A), where the left edge I of the rolling area 140 can be aligned with the left edge of the image of the finger F detected in the preview step 100 (passing through the point P). With this criterion of alignment, there is hence left the maximum space free for rolling of the finger F in the rolling direction to the right.

In one or more embodiments, it is possible also to consider as end edge E of the rolling area 140, in the direction of the rolling movement, the end edge of the detection surface 12 opposite to the initial position P.

In one or more embodiments, it is possible to consider a rolling area 140 of fixed dimensions, to be positioned on the detection surface 12 on the basis of the initial position P of the object F in such a way as to contain the entire rolling movement.

Part a) of FIG. 5 exemplifies at a schematic level an initial preview step 100. Parts b) and c) exemplify two successive partial conditions of the step 102 of rolling detection. Finally, part d) shows the image of the print acquired.

A possible complementary case is the one (FIG. 3B) where the finger F to be rolled is initially positioned in the right-hand half of the detection surface 12. This means that the finger F is likely to be rolled to the left (i.e., towards the centre of the detection surface 12), as indicated by the arrow R.

In one or more embodiments, as an alternative to the method of "rolling to the centre", it is possible to define and specify a constant rolling direction (rolling only to the right or only to the left).

In one or more embodiments, where the rolling direction is "implicitly" defined in the preview step, i.e., when the finger F in the preview step 100 moves for one half of the path in the direction opposite to the "expected" future rolling direction, it may not be necessary to apply the rule of "rolling towards the centre", because the information regarding the direction of the rolling movement is already contained in the direction of the movement itself. In other words, in one or more embodiments (for example, when the finger F in the preview step 100 moves for one half of the path in the direction opposite to the future "expected" rolling direction) the rolling direction may be chosen as a function of the rolling direction detected at the moment of detection of the initial position of the finger positioned on the detection surface 12.

In one or more embodiments, the height of the rolling area 140—detected in a direction orthogonal to the direction of the rolling movement (hence in a vertical direction in the figures)—may be equal to the height of the detection surface 12, for example in the region of 40 mm.

In one or more embodiments, the fact that the rolling area 140 is positioned following upon a first enable exploitation of the maximum rolling area available, preventing the aforesaid problems of correct initial positioning and the problems of "clipping" of the print caused by the applications with rolling areas having fixed size.

In one or more embodiments, the images thus gathered during the step of detection and rolling 102 may be processed in a step 104 in order to produce a composite roll image schematically shown, for example, in part d) of FIG. 5.

Step 106 of the flowchart of FIG. 4 exemplifies schematically other possible operations of processing of the image (storage, display, comparison with other images in databases, etc.) that may be carried out according to criteria in themselves known, before arriving at a final step (STOP).

In one or more embodiments, a detection system as described herein may enable detection of fingerprints of different dimensions (for example, a thumb may have a print of a size in the rolling direction that is approximately twice that of a little finger) and may enable a "free" positioning of the finger on the detection surface not constrained to the pre-set areas used in devices according to the prior art.

Of course, without prejudice to the principle of the invention, the details of construction and the embodiments may vary, even significantly, with respect to what has been illustrated herein, purely by way of non-limiting example, without thereby departing from the sphere of protection.

The above scope of protection is defined by the annexed claims.

The invention claimed is:

1. A method of detecting an image of an object, such as part of a hand, the method including:
   providing a detection surface,
   providing an optical sensor that is able to perform a detection function on areas defined on said detection surface,
   setting said object in contact with said detection surface,
   carrying out a preview step where the detection surface is scanned by said optical sensor,
   detecting from the image an initial position (P) of said object positioned on said detection surface, wherein said initial position (P) corresponds to an outermost end of an area of a print of said object set in contact with said detection surface, where said outermost end is a peripheral portion of the image more distant from the centre of the detection surface,
   defining a fixed rolling area having dimensions, both horizontal ones and vertical ones, chosen so as to contain completely said object,
   positioning an initial edge of said rolling area in said detection surface in said initial position (P) where said object has been detected,
   carrying out a rolling movement of said object over said detection surface, and
      maintaining the rolling area established in the previous step in a fixed position with respect to said detection surface during the rolling movement of said object over said detection surface, and
   generating, starting from individual images collected during the rolling movement of said object, an overall image of said object.

2. The method of claim 1, including identifying an expected sense (R) of said rolling in a manner selected:
   as a function of said initial position (P) of said object as positioned on said detection surface;
   as rolling directed to the center of said detection surface;
   as a pre-defined rolling sense; or
   as a function of a rolling sense detected upon detecting said initial position (P) of said object as positioned on said detection surface.

3. The method of claim 1, including positioning said rolling area in said detection surface in a direction crosswise said rolling movement as an alignment selected out of:
   alignment with an upper edge of said object;
   alignment with a lower edge of said object;
   alignment with the center of said object.

4. The method of claim 1, including detecting said initial position (P) of said object as positioned on said detection surface within a preview area smaller than the detection surface.

5. A detection device including:
   a detection surface for detecting an image of an object subject to rolling over a detection surface,
   a sensor for detecting said image on a rolling area for said object located in said detection surface, and
   processing means connected to said sensor for detecting an initial position (P) of said object positioned on said detection surface, said processing means being configured for implementing the method according to claim 1.

6. A computer program product on a non-transitory computer-readable medium, which is loadable in a memory of a computer and which includes software code portions for implementing the method of claim 1 when run on the computer.

* * * * *